US012090752B2

(12) United States Patent
Akiyama

(10) Patent No.: US 12,090,752 B2
(45) Date of Patent: Sep. 17, 2024

(54) RECORDING DEVICE, METHOD OF CONTROLLING RECORDING DEVICE, AND NON-TRANSITORY COMPUTER-READABLE MEDIUM STORING PROGRAM

(71) Applicant: SEIKO EPSON CORPORATION, Tokyo (JP)

(72) Inventor: Taiki Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 114 days.

(21) Appl. No.: 18/059,489

(22) Filed: Nov. 29, 2022

(65) Prior Publication Data

US 2023/0168600 A1 Jun. 1, 2023

(30) Foreign Application Priority Data

Nov. 30, 2021 (JP) ................................ 2021-194466

(51) Int. Cl.
*B41J 13/03* (2006.01)
*B41J 11/00* (2006.01)
*B41J 13/00* (2006.01)
*B41J 13/08* (2006.01)

(52) U.S. Cl.
CPC ............. *B41J 13/03* (2013.01); *B41J 11/007* (2013.01); *B41J 13/0027* (2013.01); *B41J 11/0085* (2013.01); *B41J 13/08* (2013.01)

(58) Field of Classification Search
CPC ...... B41J 13/03; B41J 11/007; B41J 13/0027; B41J 11/0085; B41J 13/08
See application file for complete search history.

(56) References Cited

U.S. PATENT DOCUMENTS

2006/0033968 A1* 2/2006 Maki ...................... B41J 13/106 358/498
2010/0021219 A1* 1/2010 Hori ........................... B41J 3/28 399/388
2010/0118097 A1 5/2010 Ichinose

FOREIGN PATENT DOCUMENTS

JP 2010-111488 A 5/2010

* cited by examiner

*Primary Examiner* — Henok D Legesse
(74) *Attorney, Agent, or Firm* — WORKMAN NYDEGGER

(57) ABSTRACT

A recording device includes a recording head that performs recording on a medium, a transport belt that sucks and transports the medium at a position facing the recording head, a charging unit that forms a charging sucking area on the transport belt, in which the medium is sucked by charging, by applying a voltage to the transport belt, and a control section that controls the charging unit. A belt downstream roller pair that transports the medium is provided downstream of the transport belt in a medium transport direction. After a downstream end of the medium is nipped by the belt downstream roller pair, the control section controls the charging unit so that an upstream area downstream of an upstream end of the medium, which is an area including the upstream end of the medium, does not come into contact with the charging sucking area of the transport belt.

11 Claims, 7 Drawing Sheets

RECORDING DEVICE, METHOD OF CONTROLLING RECORDING DEVICE, AND NON-TRANSITORY COMPUTER-READABLE MEDIUM STORING PROGRAM

The present application is based on, and claims priority from JP Application Serial Number 2021-194466, filed Nov. 30, 2021, the disclosure of which is hereby incorporated by reference herein in its entirety.

BACKGROUND

1. Technical Field

The present disclosure relates to a recording device that records on a medium. In addition, the present disclosure relates to a method of controlling a recording device and a non-transitory computer-readable medium storing a program.

2. Related Art

A recording device typified by a printer may employ a configuration in which a medium typified by a recording sheet is transported using a transport belt. Furthermore, in such a configuration, a configuration may be used in which the medium is sucked on the transport belt by charging the transport belt (see JP-A-2010-111488).

FIGS. 10A and 10B are diagrams for describing a problem of the above-described technique in the related art, and in FIG. 10A, symbol P denotes a medium. In a high-temperature and high-humidity environment, as illustrated in FIG. 10A, the medium P contains moisture, and four sides of the medium P may be swollen and wavy.

FIG. 10B illustrates a case of transporting the medium P having four wavy sides as described above. Reference numeral 102 denotes a transport belt, and reference numerals 100 and 101 denote pulleys around which the transport belt 102 is wound. An arrow denotes a medium transport direction, and the medium P is transported upward in the drawing.

In this case, when side end portions of the medium P in a width direction that intersects the medium transport direction are sucked on the transport belt 102 before a central portion, the side edge portions of the medium P are drawn toward the center as the transport progresses, and as denoted by Ws, a bulge is formed such that a height from the transport belt 102 increases toward an upstream end of the medium P. The bulge Ws is a factor of decreased recording quality. However, when a sucking force of the medium P by the transport belt 102 is suppressed in order to suppress such a bulge Ws, a transport force decreases and recording quality thus decreases.

SUMMARY

According to a first aspect of the disclosure, there is provided a recording device, including a recording head that performs recording on a medium; a transport belt that sucks and transports the medium at a position facing the recording head; a charging unit that forms a charging sucking area on the transport belt, in which the medium is sucked by charging, by applying a voltage to the transport belt; and a control section that controls the charging unit, in which a belt downstream roller pair that transports the medium is provided downstream of the transport belt in a medium transport direction, and after a downstream end of the medium is nipped by the belt downstream roller pair, the control section controls the charging unit so that an upstream area downstream of an upstream end of the medium, which is an area including the upstream end of the medium, does not come into contact with the charging sucking area of the transport belt.

According to a second aspect of the present disclosure, there is provided a method of controlling a recording device including a recording head that performs recording on a medium, a transport belt that sucks and transports the medium at a position facing the recording head, and a charging unit that forms a charging sucking area on the transport belt, in which the medium is sucked by charging, by applying a voltage to the transport belt, the method including not bringing an upstream area downstream of an upstream end of the medium, which is an area including the upstream end of the medium, come into contact with the charging sucking area of the transport belt after a downstream end of the medium is nipped by a belt downstream roller pair provided downstream of the transport belt in a medium transport direction.

According to a third aspect of the present disclosure, there is provided a non-transitory computer-readable storage medium storing a program to be executed by a control section of a recording device including a recording head that performs recording on a medium, a transport belt that sucks and transports the medium at a position facing the recording head, and a charging unit that forms a charging sucking area on the transport belt, in which the medium is sucked by charging, by applying a voltage to the transport belt, the program including controlling the charging unit so that an upstream area downstream of an upstream end of the medium, which is an area including the upstream end of the medium, does not come into contact with the charging sucking area of the transport belt after a downstream end of the medium is nipped by a belt downstream roller pair provided downstream of the transport belt in a medium transport direction.

DESCRIPTION OF EXEMPLARY EMBODIMENTS

Figure 1:
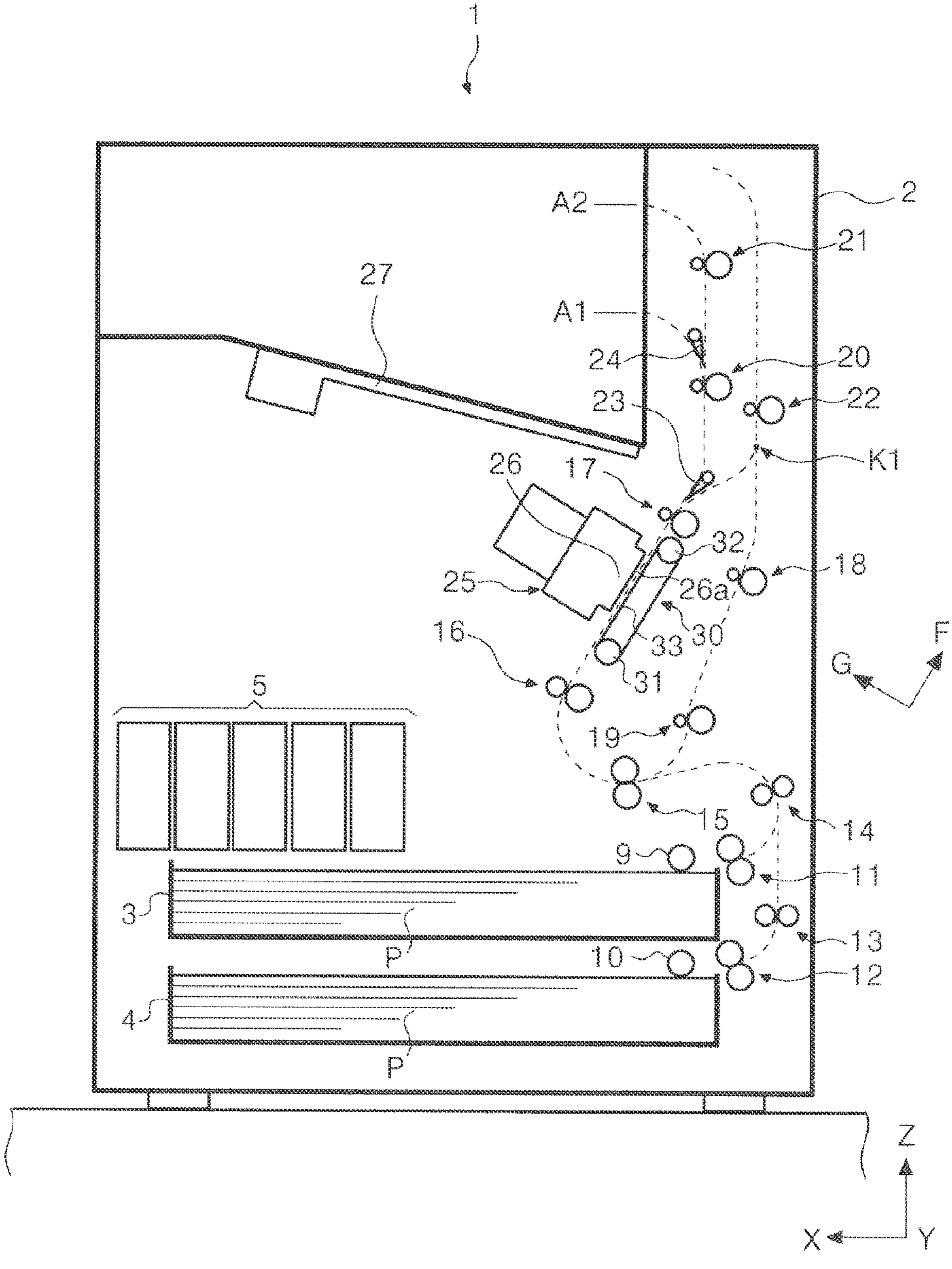
FIG. 1 is a diagram illustrating a medium transport path of a printer.

The present disclosure will be briefly described below.

According to a first aspect, a recording device includes a recording head that performs recording on a medium; a transport belt that sucks and transports the medium at a position facing the recording head; a charging unit that forms a charging sucking area on the transport belt, in which the medium is sucked by charging, by applying a voltage to the transport belt; and a control section that controls the charging unit, in which a belt downstream roller pair that transports the medium is provided downstream of the transport belt in a medium transport direction, and after a downstream end of the medium is nipped by the belt downstream roller pair, the control section controls the charging unit so that an upstream area downstream of an upstream end of the medium, which is an area including the upstream end of the medium, does not come into contact with the charging sucking area of the transport belt.

According to this aspect, since the control section of the recording device controls the charging unit so that an upstream area downstream of an upstream end of the medium, which is an area including the upstream end of the medium, does not come into contact with the charging sucking area of the transport belt after the downstream end of the medium is nipped by the belt downstream roller pair, it is possible to suppress the occurrence of a bulge Ws described with reference to FIG. 10B, and furthermore, it is possible to suppress the deterioration in recording quality.

Furthermore, after the downstream end of the medium is nipped by the belt downstream roller pair, the medium is reliably transported by the belt downstream roller pair, and the recording quality is ensured.

According to a second aspect, in the first aspect, the control section controls the charging unit so that the charging sucking area of the transport belt comes into contact with the medium until the downstream end of the medium is nipped by the belt downstream roller pair.

According to this aspect, since the control section controls the charging unit so that the charging sucking area of the transport belt comes into contact with the medium until the downstream end of the medium is nipped by the belt downstream roller pair, it is possible to suppress slippage between the transport belt and the medium and suppress the deterioration in recording quality.

According to a third aspect, in the second aspect, the control section controls the charging unit so that the charging sucking area of the transport belt covers a recordable area in which the recording head is configured to perform recording at a timing when the downstream end of the medium reaches a nip position of the belt downstream roller pair.

When the downstream end of the medium is nipped by the belt downstream roller pair, there is a risk that the recording quality will deteriorate due to transport disturbance. However, according to this aspect, since the control section controls the charging unit so that the charging sucking area of the transport belt covers the recordable area in which the recording can be performed by the recording head at the timing when the downstream end of the medium reaches the nip position of the belt downstream roller pair, the medium in the recordable area is sucked on the charging sucking area, so it is possible to suppress the transport disturbance and suppress the deterioration in the recording quality.

According to a fourth aspect, in the third aspect, the control section controls the charging unit so that a position of an upstream end of the charging sucking area of the transport belt is a position of an upstream end of the recordable area at the timing when the downstream end of the medium reaches the nip position of the belt downstream roller pair.

According to this aspect, since the control section controls the charging unit so that the position of the upstream end of the charging sucking area of the transport belt is the position of the upstream end of the recordable area at the timing when the downstream end of the medium reaches the nip position of the belt downstream roller pair, the charging sucking area is minimized, so it is possible to effectively suppress the occurrence of the bulge Ws described with reference to FIG. 10B.

According to a fifth aspect, in the first aspect, the control section controls the charging unit so that application of the voltage to the transport belt is switched from on to off after the downstream end of the medium is nipped by the belt downstream roller pair.

According to this aspect, since the control section controls the charging unit so that the application of the voltage to the transport belt is switched from on to off after the downstream end of the medium is nipped by the belt downstream roller pair, the medium is reliably transported by the charging sucking area of the transport belt until the downstream end of the medium is nipped by the belt downstream roller pair, and the medium is reliably transported by the belt downstream roller pair after the downstream end of the medium is nipped by the belt downstream roller pair.

According to a sixth aspect, in the first aspect, the control section controls the charging unit so that application of the voltage to the transport belt is switched from on to off when the downstream end of the medium is positioned between the transport belt and the belt downstream roller pair.

According to this aspect, since the control section controls the charging unit so that the application of the voltage to the transport belt is switched from on to off when the downstream end of the medium is positioned between the transport belt and the belt downstream roller pair, it is possible to avoid the formation of a state in which the medium is not sucked on the charging sucking area until the downstream end of the medium is nipped by the belt downstream roller pair and it is possible to suppress the deterioration in the recording quality as the transport force of the medium decreases.

According to a seventh aspect, in any one of the first to sixth aspects, the upstream area is an area having a length of ½ or less of a medium length from the upstream end of the medium in a downstream direction.

According to this aspect, since the upstream area is the area having a length of ½ or less of the medium length from the upstream end of the medium in the downstream direction, it is possible to secure the transport force of the medium and suppress the occurrence of the bulge Ws described with reference to FIG. 10B.

According to an eighth aspect, in any one of the first to seventh aspects, a friction imparting section is provided for generating charging due to friction on the transport belt.

According to this aspect, since the transport belt is provided with the friction imparting section that causes the transport belt to be charged by friction, even when the transport belt is not formed with the charging sucking area formed by applying a voltage to the transport belt, it is possible to obtain the sucking force to some extent by frictional electrification, and suppress the medium from floating from the transport belt. As a result, it is possible to suppress the deterioration in the recording quality due to the floating of the medium from the transport belt.

In any one of the first to eighth aspects, a ninth aspect includes a temperature/humidity measuring section that measures the temperature/humidity in the device, and the control section allows, in accordance with information obtained from the temperature/humidity measuring section, the upstream area to come into contact with the charging sucking area when the temperature is less than a first threshold value and the humidity is less than a second threshold value.

Figure 10B:
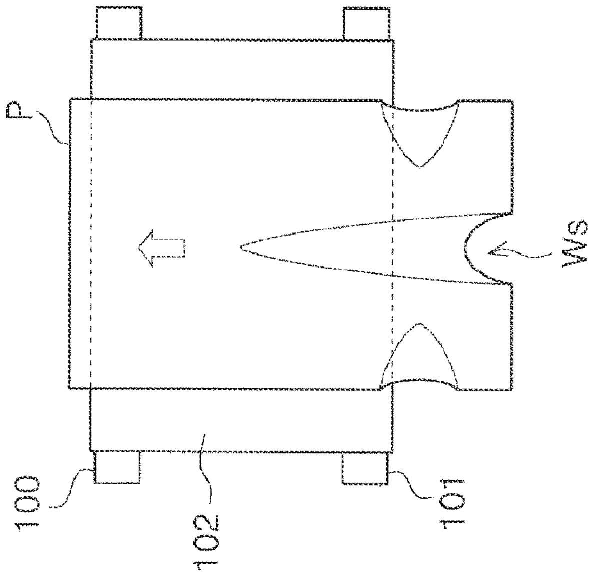
FIG. 10A is a diagram illustrating a state of the medium that absorbs moisture and FIG. 10B is a diagram illustrating a bulge that occurs when the medium that absorbs moisture is transported by the transport belt.
Figure 10A:
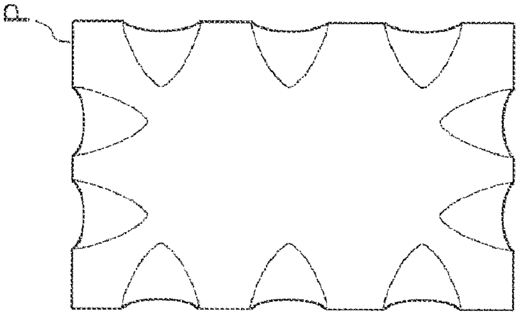

When the temperature is less than a first threshold value and the humidity is less than a second threshold value, that is, in a non-high-temperature and non-high-humidity environment, it is difficult for the medium to absorb moisture, and the bulge Ws described with reference to FIG. 10B is unlikely to occur. In such a case, it is preferable to prioritize the sucking of the medium on the transport belt.

According to this aspect, since the control section allows, in accordance with the information obtained from the temperature/humidity measuring section, the upstream area to contact the charging sucking area when the temperature is less than the first threshold value and the humidity is less than the second threshold value, it is possible to improve the transport precision of the medium.

According to a tenth aspect, there is provided a method of controlling a recording device including a recording head that performs recording on a medium, a transport belt that sucks and transports the medium at a position facing the recording head, and a charging unit that forms a charging sucking area on the transport belt, in which the medium is sucked by charging, by applying a voltage to the transport belt, the method including not bringing an upstream area downstream of an upstream end of the medium, which is an area including the upstream end of the medium, come into contact with the charging sucking area of the transport belt after a downstream end of the medium is nipped by a belt downstream roller pair provided downstream of the transport belt in a medium transport direction.

According to this aspect, since the upstream area downstream of the upstream end of the medium, which is the area including the upstream end of the medium, does not come into contact with the charging sucking area of the transport belt after the downstream end of the medium is nipped by the belt downstream roller pair provided downstream of the transport belt in the medium transport direction, it is possible to suppress the occurrence of the bulge Ws described with reference to FIG. 10B, and furthermore, it is possible to suppress the deterioration in the recording quality.

After the downstream end of the medium is nipped by the belt downstream roller pair, the medium is reliably transported by the belt downstream roller pair, and the recording quality is ensured.

According to an eleventh aspect, there is provided a non-transitory computer-readable storage medium storing a program to be executed by a control section of a recording device including a recording head that performs recording on a medium, a transport belt that sucks and transports a medium at a position facing the recording head, and a charging unit that forms a charging sucking area on the transport belt, in which the medium is sucked by charging, by applying a voltage to the transport belt, the program including controlling the charging unit so that an upstream area downstream of an upstream end of the medium, which is an area including the upstream end of the medium, does not come into contact with the charging sucking area of the transport belt after a downstream end of the medium is nipped by a belt downstream roller pair provided downstream of the transport belt in a medium transport direction.

According to this aspect, since the charging unit is controlled so that the upstream area downstream of the upstream end of the medium, which is the area including the upstream end of the medium, does not come into contact with the charging sucking area of the transport belt after the downstream end of the medium is nipped by the belt downstream roller pair provided downstream of the transport belt in the medium transport direction, it is possible to suppress the occurrence of the bulge Ws described with reference to FIG. 10B, and furthermore, it is possible to suppress the deterioration in the recording quality.

After the downstream end of the medium is nipped by the belt downstream roller pair, the medium is reliably transported by the belt downstream roller pair, and the recording quality is ensured.

The present disclosure will be described in detail below.

In the following description, an ink jet printer 1 that performs recording by ejecting liquid typified by ink onto a medium typified by recording paper will be described as an example of a recording device. The ink jet printer 1 will be denoted as a printer 1 below.

An XYZ coordinate system illustrated in each drawing is an orthogonal coordinate system, and a Y-axis direction is a width direction that intersects a medium transport direction and is a device depth direction. In a Y-axis direction, a +Y direction is a direction from a front of the device to a rear of the device, and a −Y direction is a direction from the rear of the device to the front of the device.

In addition, an X-axis direction is a width direction of the device, and as seen from an operator of the printer 1, a +X direction, indicated by an arrow direction, denotes a left side, and a −X direction opposite thereto denotes a right side. A Z-axis direction is a vertical direction, that is, a device height direction, and a +Z direction, indicated by an arrow, is an upward direction, and a −Z direction opposite thereto is a downward direction.

In addition, a G-axis direction is a direction normal to an ink ejection surface 26*a* of a linehead 26, which will be described later, and a +G direction, indicated by an arrow, is a direction in which a head unit 25, which will be described later, separates from a transport belt 33, and a −G direction opposite thereto is a direction in which the head unit 25 approaches the transport belt 33.

In addition, an F-axis direction is parallel to the ink ejection surface 26*a* and is a medium transport direction at a position facing the ink ejection surface 26*a*, and a +F direction, indicated by an arrow, denotes downstream in the transport direction, and a −F direction opposite thereto denotes upstream in the transport direction. In the following description, the direction in which the medium is fed may be denoted as “downstream”, and the direction opposite thereto may be denoted as “upstream”.

Also, in some drawings, the F-G-Y coordinate system is used instead of the X-Y-Z coordinate system.

A medium transport path is illustrated by a broken line in FIG. 1. In the printer 1, the medium is transported along the medium transport path illustrated by a broken line.

A device main body 2 of the printer 1 includes a first medium cassette 3 and a second medium cassette 4 which contain a medium before being fed. Symbol P indicates the medium accommodated in each medium cassette. The first medium cassette 3 and the second medium cassette 4 are detachably attached to the device main body 2 from the front side of the device.

The first medium cassette 3 is provided with a pick roller 9 to send out the contained medium, and the second medium cassette 4 is provided with a pick roller 10 to send out the contained medium.

In addition, the first medium cassette 3 is provided with a feeding roller pair 11 to feed the sent out medium obliquely upward. In addition, the second medium cassette 4 is provided with a feeding roller pair 12 that feeds the sent out medium obliquely upward and a transport roller pair 13 that transports the medium upward.

In the following description, unless otherwise specified, the "roller pair" includes a driving roller driven by a motor (not illustrated) and a driven roller to be driven rotatably in contact with the driving roller.

The medium sent out from each medium cassette is sent to the transport roller pair 16 by the transport roller pair 14 and the transport roller pair 15. The medium receiving the transport force from the transport roller pair 16 is sent between the linehead 26 and the transport belt 33, that is, a position facing the linehead 26.

The linehead 26 performs printing by ejecting ink onto a surface of the medium. The linehead 26 is an ink ejecting head configured so that nozzles (not illustrated) ejecting ink cover the entire area in the width direction of the medium, and is configured as an ink ejecting head capable of recording over the entire width of the medium without moving in the width direction of the medium. The linehead 26 is an example of a liquid ejecting head that ejects liquid.

However, the ink ejecting head may be of a type that performs recording while moving in the width direction of the medium.

Reference numeral 5 denotes an ink containing section that contains ink. The ink ejected from the linehead 26 is supplied from the ink containing section 5 to the linehead 26 via a tube (not illustrated). The ink containing section 5 is configured to include a plurality of ink tanks arranged in the X-axis direction.

The transport belt 33, a driving pulley 31, and a driven pulley 32 constitute the belt unit 30. The transport belt 33 is an endless belt that is looped around the driving pulley and the driven pulley 32. The transport belt 33 rotates in response to a motor 47 (see FIG. 2) rotating the driving pulley 31.

The medium is transported to a position facing the linehead 26 while being sucked on the transport belt 33. The sucking of the medium on the transport belt 33 will be described later.

Here, the medium transport path passing through the position facing the linehead 26 intersects both the horizontal direction and the vertical direction, and is configured to transport the medium obliquely upward. This obliquely upward transport direction is a direction that includes a −X direction component and a +Z direction component in FIG. 1, and with such a configuration, the size of the printer 1 can be suppressed horizontally.

In the present embodiment, the medium transport path passing through the position facing the linehead 26 is set at an inclination angle of 50° to 70° with respect to the horizontal direction, and more specifically at an inclination angle of 60°.

The medium on which recording has been performed on a first surface by the linehead 26 is further sent obliquely upward by a transport roller pair 17 positioned downstream of the transport belt 33. In the following description, the transport roller pair 17 is referred to as the belt downstream roller pair 17.

A flap 23 is provided downstream of the belt downstream roller pair 17, and the flap 23 switches the transport direction of the medium. When the medium is ejected as it is, the medium transport path of the medium is switched by the flap 23 so as to be directed toward an upper transport roller pair 20. A flap 24 is provided downstream of the transport roller pair 20 and switches the transport path to either ejection from an ejection position A1 or transport to a transport roller pair 21 positioned further vertically above. When the medium is fed toward the transport roller pair 21, the medium is ejected from an ejection position A2.

The medium ejected from the ejection position A1 is received by an ejection tray 27 inclined obliquely upward in a direction including the +X direction component and the +Z direction component. The medium ejected from the ejection position A2 is received by an optional tray (not illustrated).

When recording is performed on a second surface of the medium in addition to the first surface of the medium, the medium is fed obliquely upward in a direction including the −X direction component and the +Z direction component by the flap 23, passes through a branch position Kl, and is fed to an upper switchback path from the branch position Kl. The switchback path is provided with a transport roller pair 22, and the medium entering the switchback path is transported upward by the transport roller pair 22, and the medium is transported upward. When the upstream end of the medium passes through the branch position Kl, a rotation direction of the transport roller pair 22 is switched to transport the medium downward.

The medium transported downward by the transport roller pair 22 receives a feeding force from a transport roller pair 18, a transport roller pair 19, and the transport roller pair 15, reaches the transport roller pair 16, and is fed again to the transport belt 33 by the transport roller pair 16.

The medium fed to the position facing the linehead 26 again faces the linehead 26 on the second surface opposite to the first surface on which recording has already been performed. As a result, the recording can be performed on the second surface of the medium by the linehead 26. The medium on which the recording has been performed on the second surface is ejected from the ejection position A1 or the ejection position A2.

Next, the belt unit 30 and its peripheral structure will be described with reference to FIG. 2. The transport belt 33 constituting the belt unit 30 is an endless belt made of a base material such as urethane, rubber, or the like, that contains a conductive material as necessary to adjust a resistance value, and is wound around the driving pulley 31 provided upstream and the driven pulley 32 provided downstream. A predetermined tension is applied to the transport belt 33 by a tensioner (not illustrated).

The driving pulley 31 is driven to rotate by the motor 47 controlled by a control section 50. When the driving pulley 31 is driven to rotate in the arrow direction, the transport belt 33 rotates clockwise in FIG. 2, and the medium sucked on the transport belt 33 is transported in the +F direction, that is, in the downstream direction.

Support plates 36 and 37 are provided inside the transport belt 33, and the transport belt 33 is provided in a state in which the support plates 36 and 37 restrict inward deflection. In the present embodiment, the support plates 36 and 37 are made of a conductive material such as metal and are grounded.

A charging roller 40 is provided at a position facing the driving pulley 31 with the transport belt 33 interposed therebetween.

The charging roller 40 comes into contact with an outer surface of the transport belt 33 and rotates to be driven according to the rotation of the transport belt 33. The charging roller 40 is attached to a power supply device 41 that applies a DC voltage to the charging roller 40, and the charging roller 40 supplies an electric charge to a portion that comes into contact with the transport belt 33. The power supply device 41 is controlled by the control section 50 so that the voltage application to the charging roller 40 is switched from on to off or a voltage applied to the charging roller 40 is switched.

In the present embodiment, the charging roller 40 supplies a positive electric charge to the transport belt 33 to charge the outer surface of the transport belt 33 to have a positive polarity so that the outer surface of the transport belt 33 becomes a sucking surface 33*a* for sucking the medium. When the transport belt 33 passes the position of the charging roller 40 to which a voltage is applied, the portion becomes the charged area of the transport belt 33.

The charging roller 40 and the power supply device 41 constitute a charging unit 39 for charging the transport belt 33.

An anti-static brush 42 in contact with the medium is provided upstream of the linehead 26, and the anti-static brush 42 removes an electric charge on the upper surface of the medium or the outer surface of the transport belt 33, that is, the sucking surface 33*a*.

More specifically, when the charging roller 40 imparts a charge to the sucking surface 33*a* of the transport belt 33, for the medium in contact with the sucking surface 33*a*, an electric charge having an opposite polarity is generated on a surface in contact with the sucking surface 33*a*, and furthermore, an electric charge having an opposite polarity to the electric charge is also generated on an opposite side of the medium, that is, a recording surface. The electric charge on the recording surface side is removed by the anti-static brush 42, and thus, only the electric charge on the side in contact with the transport belt 33 remains on the medium, such that the medium more strongly sucked on the sucking surface 33*a*.

The anti-static brush 42 may be made of any material, for example, a resin material such as conductive nylon, as long as it can remove the electric charge from the medium and the transport belt 33.

The anti-static brush 42 is grounded.

However, the anti-static brush 42 can be configured to be switched between grounded and non-grounded states. When the anti-static brush 42 is in the non-grounded state, the anti-static brush 42 may be used as the friction imparting section.

In the following description, charging of the transport belt 33 by the charging roller 40 may be referred to as voltage application charging. In FIG. 2, symbol Ka denotes an area of the transport belt 33 in which the medium can be sucked by the voltage application charging in the transport belt 33, which is hereinafter referred to as an electrostatic suckable area Ka. The electrostatic suckable area Ka is an area between a start position and an end position of a planar area of the transport belt 33.

Next, a cleaning blade 38 is provided on a lower side of the belt unit 30. The cleaning blade 38 is provided so as to pinch the transport belt 33 against the support plate 37, and by wiping the sucking surface 33*a*, ink, foreign substances, or the like, which adheres to the sucking surface 33*a*, is removed. The cleaning blade 38 may be made of a resin material or the like such as a polyethylene terephthalate (PET) film.

The motor 47 and the power supply device 41 that are described above, and a switching section are coupled to a control section 50 as a control unit. The control section 50 acquires recording data, which is data for recording, generated by a printer driver that operates on an external computer (not illustrated) or a printer driver provided in the control section 50. Based on the recording data, each mechanical part such as the linehead 26 or the motors for transporting the medium is controlled. In addition, the control section 50 performs necessary control based on the detection states of various sensors.

The recording data also includes size information of the medium.

The control section 50 includes a CPU (not illustrated) and a nonvolatile memory 51. Programs and various parameters for variously controlling the printer 1 are stored in the nonvolatile memory 51. Programs and necessary parameters for realizing the control described below are all stored in the nonvolatile memory 51.

A signal from an operation section 52 is input to the control section 50, and a signal for displaying information is output from the control section 50 to a display section (not illustrated) of the operation section 52. The control section 50 performs control to store various types of setting information input via the operation section 52 in the nonvolatile memory 51. The control section 50 performs various control based on the above various types of setting information.

A temperature/humidity measuring section 53 for measuring the temperature and humidity inside the device is coupled to the control section 50, and the control section 50 can determine the temperature and humidity inside the device based on the information received from the temperature/humidity measuring section 53.

Figure 2:
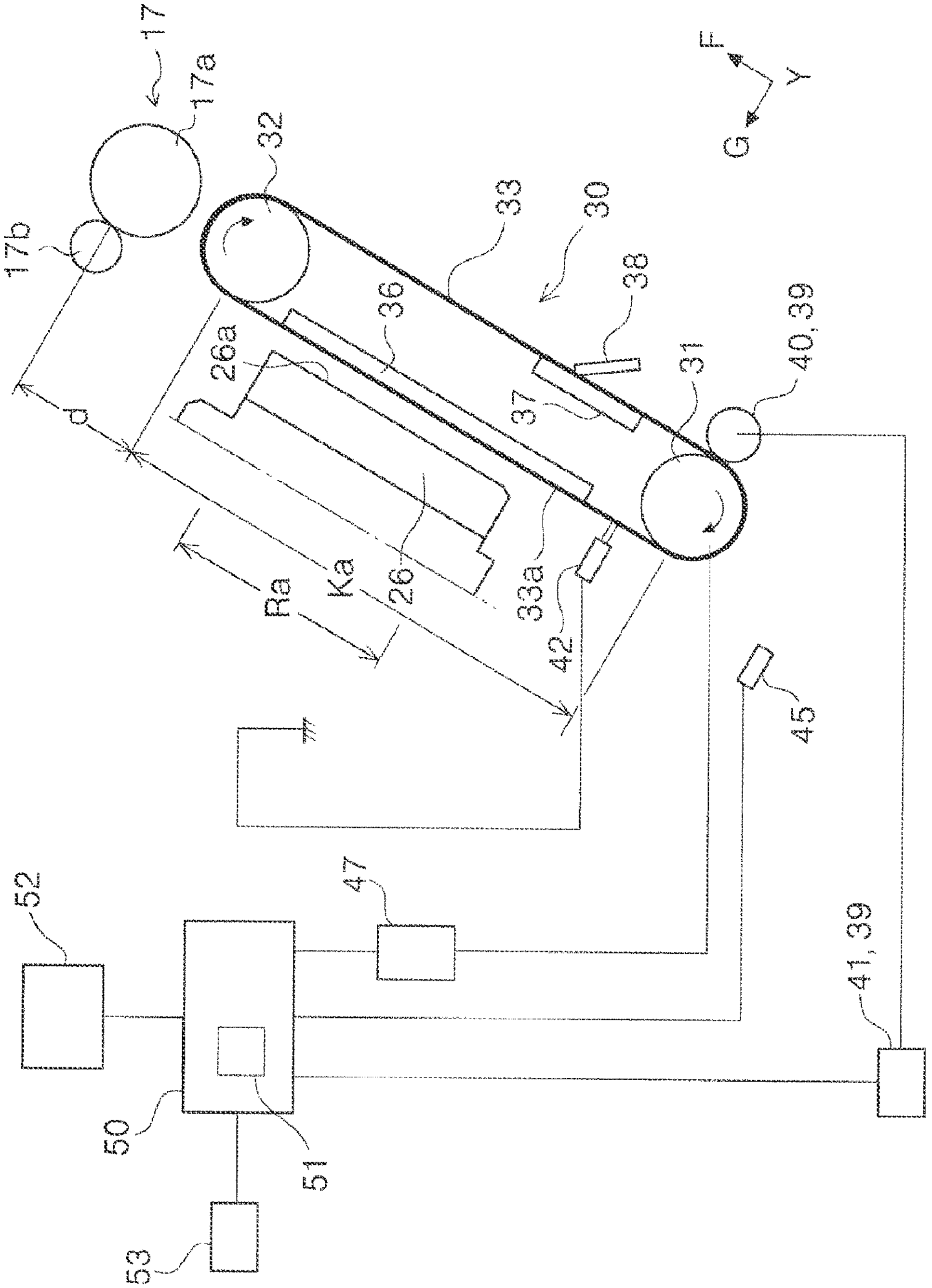
FIG. 2 is a block diagram illustrating a configuration and control system of a belt unit.

A belt upstream sensor 45 illustrated in FIG. 2 is provided upstream of the belt unit 30 and sends out a detection signal to the control section 50, so that the control section 50 can detect passage of the downstream and upstream ends of the medium at the position of the belt upstream sensor 45.

For example, the control section 50 can determine a starting timing of the voltage application charging or an ending timing of the voltage application charging by detecting passage of the downstream end or the upstream end of the medium at the position of the belt upstream sensor 45.

The belt upstream sensor 45 may be provided downstream of the transport roller pair 16 (see FIG. 1), or may be provided upstream of the transport roller pair 16. When the belt upstream sensor 45 is provided downstream with respect to the transport roller pair 16, the belt upstream sensor 45 is positioned between the transport roller pair 16 and the transport belt 33 on the medium transport path. When the belt upstream sensor 45 is provided upstream with respect to the transport roller pair 16, the belt upstream sensor 45 is positioned between the transport roller pair 15 and the transport roller pair 16 on the medium transport path.

The belt downstream roller pair 17 provided downstream of the transport belt 33 includes a motor-driven driving roller 17*a* and a contact roller 17*b* in contact with the driving roller 17*a*. The driving roller 17*a* may be driven by the motor 47, which is a driving source of the driving pulley 31, or may be driven by another motor. In addition, both the driving roller 17*a* and the contact roller 17*b* may be motor-driven. The belt downstream roller pair 17 is controlled by the control section 50.

In FIG. 2, symbol d denotes an area between a nip position of the belt downstream roller pair 17 and a downstream end of the electrostatic suckable area Ka (described later). A path length of the area d can be set to be, for example, 1 mm to 70 mm.

In FIG. 2, an area Ra is a recordable area which recording can be performed by the linehead 26. In the present embodiment, a path length of the area d is shorter than that of the area Ra.

As described above, the control section 50 can perform the turn on/off control of the voltage application charging using the charging roller 40.

In the present embodiment, since the transport belt 33 is frictionally charged through contact with the cleaning blade 38, the cleaning blade 38 constitutes a friction imparting section that causes the transport belt 33 to be charged by friction.

In the case where the anti-static brush 42 is configured to be switchable between the grounded state and the non-grounded state, the anti-static brush 42 may be in a grounded state when the voltage application charging is in an on state, and may be in the non-grounded state when the voltage application charging is in an off state. In this case, when the voltage application charging is in an off state, the transport belt 33 is frictionally charged through contact with the anti-static brush 42. When adopting such a configuration, the anti-static brush 42 and the cleaning blade 38 constitute the friction imparting section that causes the transport belt 33 to be charged by friction.

Next, an example of the control of the voltage application charging will be described with reference to FIG. 3 and subsequent drawings.

Figure 3:
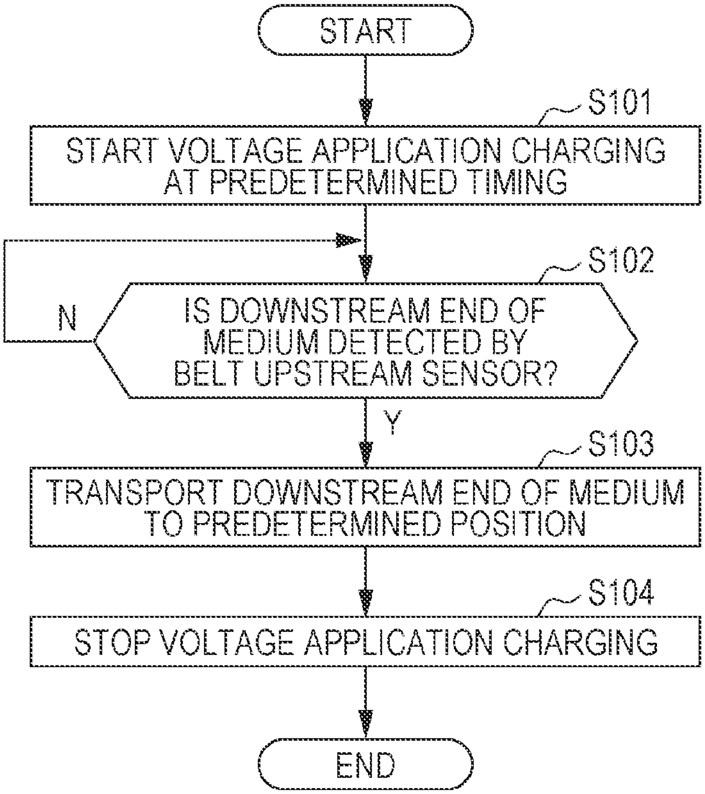
FIG. 3 is a flowchart illustrating a flow of charging control of a transport belt performed by a control section.

In FIG. 3, the control section 50 starts the voltage application charging of the transport belt 33 at a predetermined timing (step S101). Also, the predetermined timing is, for example, a feeding start timing of the medium when recording is performed on the first surface of the medium. In addition, when recording is performed on the second surface opposite to the first surface after recording is performed on the first surface of the medium, the timing when the upstream end of the medium on which the recording has been performed passes through the belt downstream roller pair 17 may be included.

Next, when the downstream end of the medium is detected by the belt upstream sensor 45 (Yes in step S102), the control section 50 transports the downstream end of the medium to a predetermined position (step S103). When the downstream end of the medium is transported to a predetermined position, the voltage application charging is stopped (step S104).

Hereinafter, the first embodiment of the predetermined position in step S103 will be described with reference to FIGS. 4 to 7. For convenience of illustration, a part of the configuration illustrated in FIG. 2 is omitted in subsequent drawings.

Figure 4:
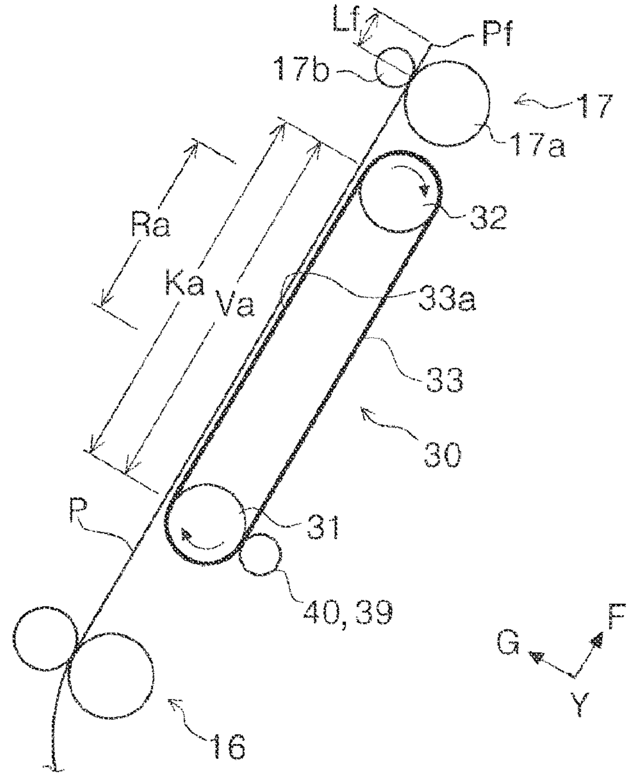
FIG. 4 is a diagram illustrating a positional relationship between the transport belt and a medium in the charging control of the transport belt.

FIG. 4 illustrates the state where a downstream end Pf of a medium P is nipped by the belt downstream roller pair 17, and symbol Lf indicates a distance that the downstream end Pf progresses downstream from the nip position of the belt downstream roller pair 17.

In addition, symbol Va denotes an area where a voltage is actually applied and a medium is electrostatically sucked in of the electrostatic suckable area Ka, which is hereinafter referred to as an actual sucking area Va.

In this state, the entire area of the electrostatic suckable area Ka is the actual sucking area Va, that is, the control section 50 continues voltage application charging until this state.

Then, when the downstream end Pf of the medium P is nipped by the belt downstream roller pair 17, the control section 50 stops the voltage application charging. That is, the state in FIG. 4 is an example of the state at the timing when the voltage application charging is switched from on to off.

Figure 5:
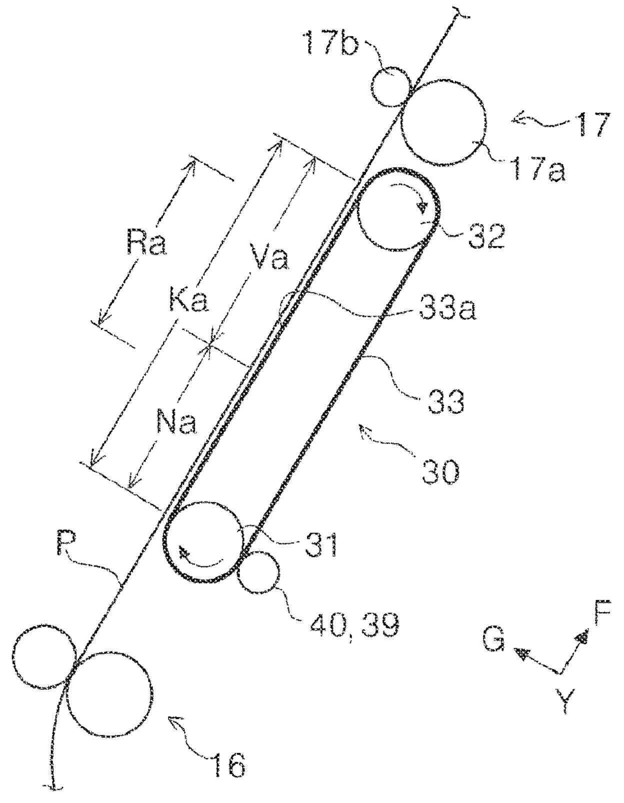
FIG. 5 is a diagram illustrating the positional relationship between the transport belt and the medium in the charging control of the transport belt.

When the control section 50 stops the voltage application charging, the actual sucking area Va occupying the electrostatic suckable area Ka shrinks from upstream as the transport belt 33 rotates. FIG. 5 illustrates an example of the process, and symbol Na indicates an area where no voltage is applied by the charging roller 40 in the electrostatic suckable area Ka, which is hereinafter referred to as the non-sucking area Na.

In the non-sucking area Na, since the sucking force associated with the above-described frictional electrification is generated, even when the actual sucking area Va formed by applying a voltage to the transport belt 33 is not formed, it is possible to obtain the sucking force to some extent by frictional electrification. As a result, it is possible to suppress the medium P from floating from the transport belt 33, and it is thereby possible to suppress the deterioration in the recording quality caused by the floating of the medium P from the transport belt 33.

In this way, the sucking force associated with frictional electrification is also generated in the non-sucking area Na, but the magnitude thereof is smaller than the sucking force in the actual sucking area Va, and does not induce the bulge Ws described with reference to FIG. 10B.

Figure 6:
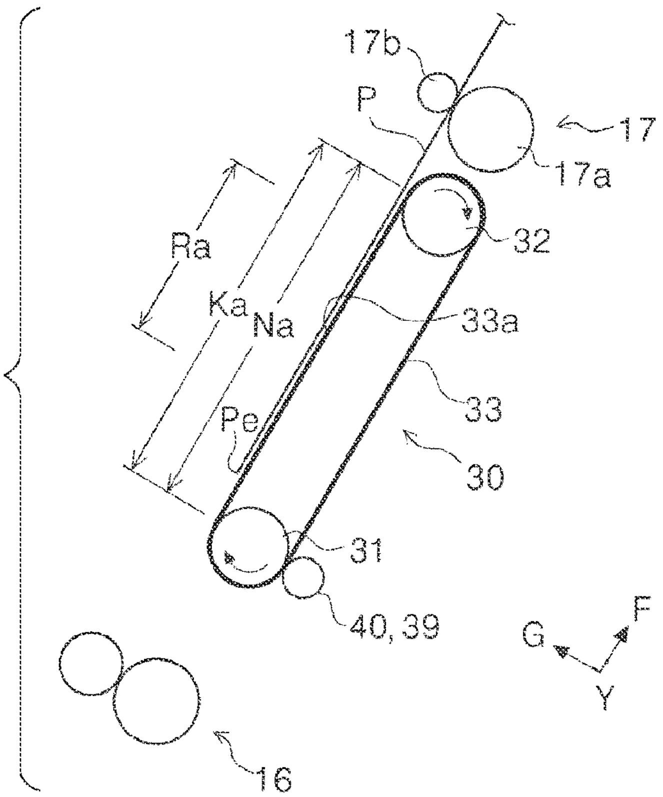
FIG. 6 is a diagram illustrating the positional relationship between the transport belt and the medium in the charging control of the transport belt.

When the transport of the medium P from the state in FIG. 5 further progresses, an upstream end Pe of the medium P enters the electrostatic suckable area Ka of the transport belt 33 as illustrated in FIG. 6. In this state, the entire area of the electrostatic suckable area Ka is the non-sucking area Na. As a result, the upstream area downstream of the upstream end Pe of the medium P is not in contact with the actual sucking area Va.

Figure 7:
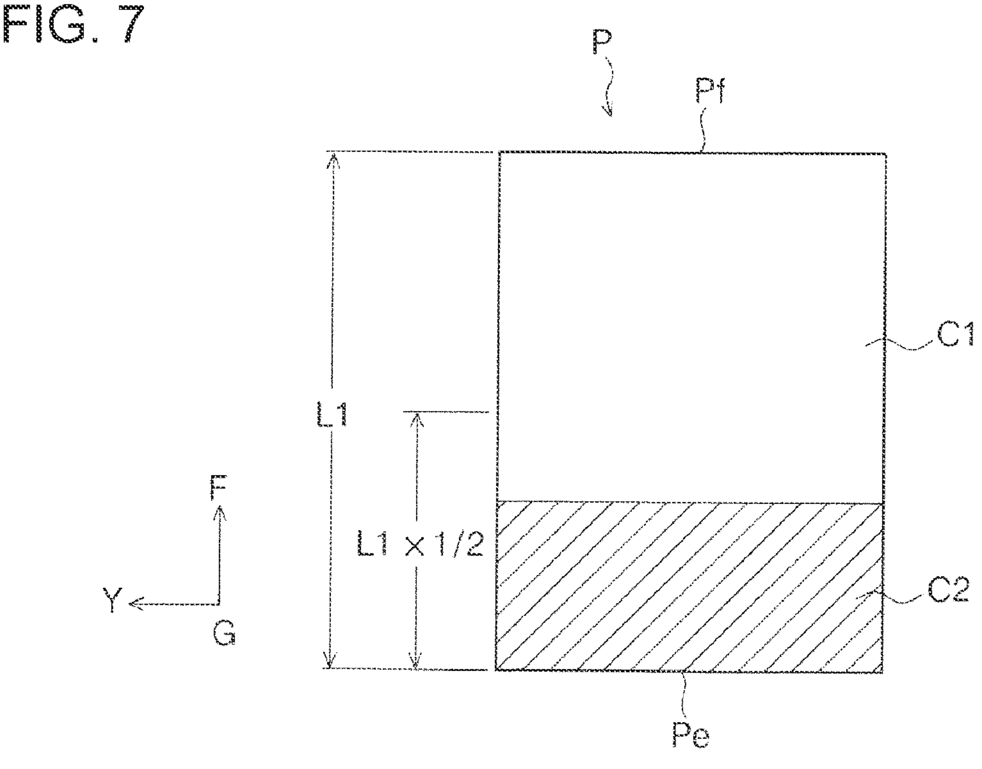
FIG. 7 is a diagram illustrating an upstream area and a downstream area set in the medium.

In FIG. 7, symbol C2 denotes an upstream area downstream of the upstream end Pe of the medium P, and symbol C1 denotes a downstream area upstream of the downstream end Pf of the medium P. The downstream area C1 comes into contact with the actual sucking area Va and the upstream area C2 hatched comes into contact with the non-sucking area Na.

In the present embodiment, the upstream area C2 is an area having a length of ½ or less of the medium length L1 from the upstream end Pe in the downward direction. More specifically, for example, the upstream area C2 is an area having a length of ⅓ or less of the medium length L1 from the upstream end Pe in the downward direction. However, the upstream area C2 may be an area having a length of ½ of the medium length L1 from the upstream end Pe in the downward direction.

The control section 50 can set the downstream area C1 in contact with the actual sucking area Va and the upstream area C2 in contact with the non-sucking area Na for the medium P based on information on the medium length L1 obtained based on driver information or information of sensors provided on the medium transport path, a medium transport speed, a belt length from a contact position between the transport belt 33 and the charging roller 40 to the upstream end of the electrostatic suckable area Ka, a driving speed of the transport belt 33, a path length from the belt upstream sensor 45 to the upstream end of the electrostatic suckable area Ka, a path length of the electrostatic suckable area Ka, and a path length from the downstream end of the electrostatic suckable area Ka to the nip position of the belt downstream roller pair 17.

As described above, the first embodiment of the predetermined position in step S103 of FIG. 3 relates to a position where the downstream end Pf progresses from the nip position of the belt downstream roller pair 17 to the downstream by a distance Lf. The distance Lf can be set to be in the range of 0 to 5 mm.

In this way, after the downstream end Pf of the medium P is nipped by the belt downstream roller pair 17, the control section 50 controls the charging unit 39 so that the upstream area C2 downstream of the upstream end Pe of the medium P does not come into contact with the actual sucking area Va of the transport belt 33. As a result, it is possible to suppress the occurrence of the bulge Ws described with reference to FIG. 10B and suppress the deterioration in the recording quality.

After the downstream end Pf of the medium P is nipped by the belt downstream roller pair 17, the medium P is reliably transported by the belt downstream roller pair 17, and the recording quality is ensured.

Further, as described above, the method of controlling a printer 1 is a method of bringing an upstream area C2 of a medium P into contact with an actual sucking area Va of a transport belt 33 after the downstream end Pf of the medium P is nipped by the belt downstream roller pair 17 provided downstream of the transport belt 33 in the medium transport direction.

In addition, a program executed by the control section 50 is a program including a step (steps S103 and S104 in FIG. 3) of not bringing the upstream area C2 of the medium P into contact with the actual sucking area Va of the transport belt 33 after the downstream end Pf of the medium P is nipped by the belt downstream roller pair 17 provided downstream of the transport belt 33 in the medium transport direction.

In addition, in the present embodiment, the control section 50 controls the charging unit 39 so that the actual sucking area Va of the transport belt 33 comes into contact with the medium P until the downstream end Pf of the medium P is nipped by the belt downstream roller pair 17. As a result, it is possible to suppress the slippage between the transport belt 33 and the medium and suppress the deterioration in the recording quality.

In addition, in the present embodiment, after the downstream end Pf of the medium P is nipped by the belt downstream roller pair 17, the control section 50 controls the charging unit 39 so that the voltage application to the transport belt 33 is switched from on to off. As a result, the medium P is reliably transported by the actual sucking area Va until the downstream end Pf of the medium P is nipped by the belt downstream roller pair 17, and after the downstream end Pf of the medium P is nipped by the belt downstream roller pair 17, the medium P is reliably transported by the belt downstream roller pair 17.

Further, in the present embodiment, as is clear from FIG. 4, the control section 50 controls the charging unit 39 so that the actual sucking area Va of the transport belt 33 covers the recordable area Ra in which the recording can be performed by the linehead 26 at the timing when the downstream end Pf of the medium P reaches the nip position of the belt downstream roller pair 17.

That is, when the downstream end Pf of the medium P is nipped by the belt downstream roller pair 17, there is a risk that the recording quality may deteriorate due to the occurrence of the transport disturbance, but at the timing when the downstream end Pf of the medium P reaches the nip position of the belt downstream roller pair 17 as described above, since the actual sucking area Va of the transport belt 33 covers the recordable area Ra, the medium P is sucked by the actual sucking area Va in the recordable area Ra, so it is possible to suppress the above-described transport disturbance and suppress the deterioration in the recording quality. The information on the path length of the recordable area Ra and the position of the recordable area Ra in the electrostatic suckable area Ka is stored in the nonvolatile memory 51 (see FIG. 2), and the control section 50 can perform the above control based on this information and the various types of information already described.

Figure 8:
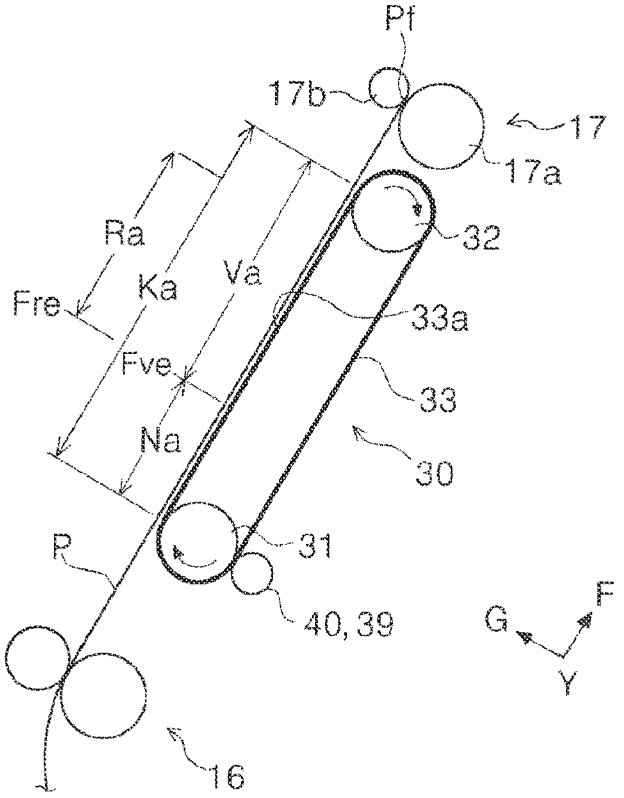
FIG. 8 is a diagram illustrating the positional relationship between the transport belt and the medium in the charging control of the transport belt.

As a modified example, as illustrated in FIG. 8, the control section 50 may control the charging unit 39 so that a position Fve of the upstream end of the actual sucking area Va of the transport belt 33 is a position Fre of the upstream end of the recordable area Ra at the timing when the downstream end Pf of the medium P reaches the nip position of the belt downstream roller pair 17.

As a result, by minimizing the actual sucking area Va, it is possible to effectively suppress the occurrence of the bulge Ws described with reference to FIG. 10B.

At this time, the downstream end Pf of the medium P may slightly progress downstream from the nip position of the belt downstream roller pair 17. Further, the position Fve of the upstream end of the actual sucking area Va of the transport belt 33 and the position Fre of the upstream end of the recordable area Ra are not limited to completely matching. For example, the position Fve of the upstream end of the actual sucking area Va of the transport belt 33 may be at a slight upstream of the position Fre of the upstream end of the recordable area Ra.

Further, as described with reference to FIG. 7 in the present embodiment, the upstream area C2 is an area having a length of ½ or less of the medium length L1 from the upstream end Pe of the medium P in the downward direction. As a result, it is possible to achieve both the securing of the transport force of the medium P and the suppression of the occurrence of the bulge Ws described with reference to FIG. 10B.

Figure 9:
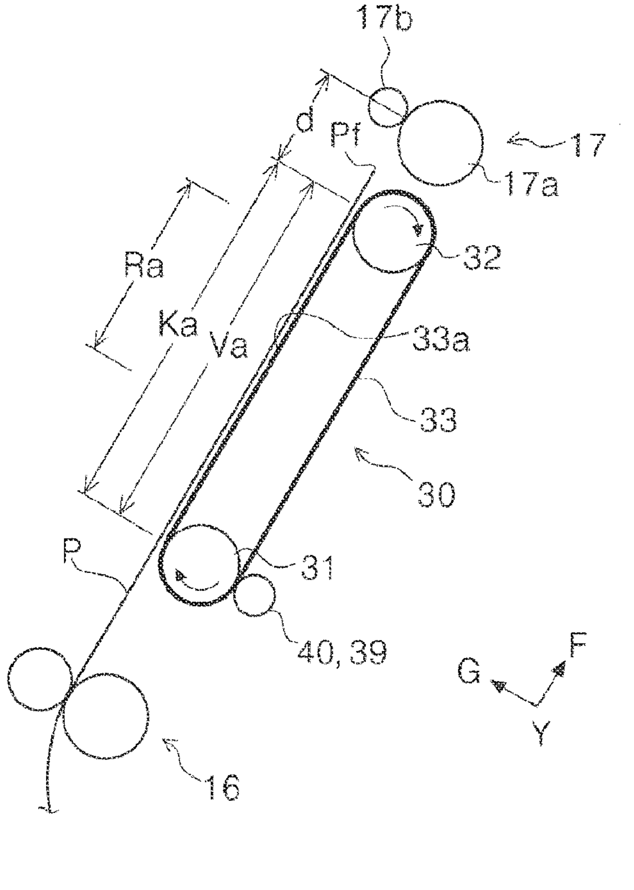
FIG. 9 is a diagram illustrating the positional relationship between the transport belt and the medium in the charging control of the transport belt.

Next, a second embodiment of the predetermined position in step S103 of FIG. 3 will be described with reference to FIG. 9. In the present embodiment, when the downstream end Pf of the medium P is positioned in the area d, that is, between the transport belt 33 and the belt downstream roller pair 17, the control section 50 controls the charging unit 39 so that the application of the voltage to the transport belt 33 is switched from on to off. Even in this case, it is possible to avoid the formation of the state in which the medium P is not sucked on the actual sucking area Va until the medium P is nipped by the belt downstream roller pair 17 and to suppress the deterioration in the recording quality as the transport force decreases.

The control section 50 may allow the contact of the upstream area C2 with the actual sucking area Va based on the information obtained from the temperature/humidity measuring section 53 when the temperature inside the device is less than the first threshold value and the humidity inside the device is less than the second threshold value. The first and second threshold values are pre-stored in the nonvolatile memory 51 (see FIG. 2).

When the temperature in the device is less than the first threshold value and the humidity in the device is less than the second threshold value, that is, in the non-high-temperature and non-high-humidity environment, it is difficult for the medium to absorb moisture, and the bulge Ws described with reference to FIG. 10B is unlikely to occur. In such a case, it is preferable to prioritize the sucking of the medium on the transport belt 33. Therefore, in such a case, since the contact of the upstream area C2 with the actual sucking area Va is allowed, the transport precision of the medium is improved. In this case, the entire area of the upstream area C2, that is, the entire area of the medium P may be brought into contact with the actual sucking area Va.

In addition, the control mode illustrated in FIG. 3 cannot be performed based on user settings via the operation section 52 (see FIG. 2). In this case, when the medium P is transported by the transport belt 33, the voltage application charging is performed always, so the entire area of the medium P comes into contact with the actual sucking area Va.

The present disclosure is not limited to the respective embodiments described above, and various modifications are possible within the scope of the disclosure described in the claims, and it goes without saying that these modifications are also included in the scope of the present disclosure.

What is claimed is:

1. A recording device, comprising:
a recording head that performs recording on a medium;
a transport belt that sucks and transports the medium at a position facing the recording head;
a charging unit that forms a charging sucking area on the transport belt, in which the medium is sucked by charging, by applying a voltage to the transport belt; and
a control section that controls the charging unit, wherein
a belt downstream roller pair that transports the medium is provided downstream of the transport belt in a medium transport direction, and
after a downstream end of the medium is nipped by the belt downstream roller pair, the control section controls the charging unit so that an upstream area downstream of an upstream end of the medium, which is an area including the upstream end of the medium, does not come into contact with the charging sucking area of the transport belt.

2. The recording device according to claim 1, wherein
the control section controls the charging unit so that the charging sucking area of the transport belt comes into contact with the medium until the downstream end of the medium is nipped by the belt downstream roller pair.

3. The recording device according to claim 2, wherein
the control section controls the charging unit so that the charging sucking area of the transport belt covers a recordable area in which the recording head is configured to perform recording at a timing when the downstream end of the medium reaches a nip position of the belt downstream roller pair.

4. The recording device according to claim 3, wherein
the control section controls the charging unit so that a position of an upstream end of the charging sucking area of the transport belt is a position of an upstream end of the recordable area at the timing when the downstream end of the medium reaches the nip position of the belt downstream roller pair.

5. The recording device according to claim 1, wherein
the control section controls the charging unit so that application of the voltage to the transport belt is switched from on to off after the downstream end of the medium is nipped by the belt downstream roller pair.

6. The recording device according to claim 1, wherein
the control section controls the charging unit so that application of the voltage to the transport belt is switched from on to off when the downstream end of the medium is positioned between the transport belt and the belt downstream roller pair.

7. The recording device according to claim 1, wherein
the upstream area is an area having a length of ½ or less of a medium length from the upstream end of the medium in a downstream direction.

8. The recording device according to claim 1, further comprising a friction imparting section that causes the transport belt to be charged by friction.

9. The recording device according to claim 1, further comprising a temperature/humidity measuring section that measures temperature and humidity in the device, wherein
the control section allows, in accordance with information obtained from the temperature/humidity measurement section, the upstream area to come into contact with the charging sucking area when the temperature is less than a first threshold value and the humidity is less than a second threshold value.

10. A method of controlling a recording device including
a recording head that performs recording on a medium,
a transport belt that sucks and transports the medium at a position facing the recording head, and
a charging unit that forms a charging sucking area on the transport belt, in which the medium is sucked by charging, by applying a voltage to the transport belt, the method comprising:
not bringing an upstream area downstream of an upstream end of the medium, which is an area including the upstream end of the medium, come into contact with the charging sucking area of the transport belt after a downstream end of the medium is nipped by a belt downstream roller pair provided downstream of the transport belt in a medium transport direction.

11. A non-transitory computer-readable storage medium storing a program to be executed by a control section of a recording device including
a recording head that performs recording on a medium,
a transport belt that sucks and transports the medium at a position facing the recording head, and
a charging unit that forms a charging sucking area on the transport belt, in which the medium is sucked by charging, by applying a voltage to the transport belt, the program comprising:
controlling the charging unit so that an upstream area downstream of an upstream end of the medium, which is an area including the upstream end of the medium, does not come into contact with the charging sucking area of the transport belt after a downstream end of the medium is nipped by a belt downstream roller pair provided downstream of the transport belt in a medium transport direction.

* * * * *